106-18.35 SR
10/20/81 XR 4,296,152

United States Patent [19] [11] 4,296,152
Kirchner [45] Oct. 20, 1981

[54] METHOD AND COMPOSITION FOR TREATING WOOD WITH PENTACHLOROPHENOL

[75] Inventor: Roy P. Kirchner, Tallahassee, Fla.

[73] Assignee: Idacon, Inc., Houston, Tex.

[21] Appl. No.: 135,992

[22] Filed: May 8, 1980

[51] Int. Cl.[3] .......................... C09D 5/16; C09D 5/18; B05D 1/18; B05D 3/00

[52] U.S. Cl. .................................. 427/440; 106/18.35; 427/297; 428/537; 428/907

[58] Field of Search ............... 427/440, 441, 297, 298; 106/18.35; 428/537, 907

[56] References Cited

U.S. PATENT DOCUMENTS

| | | | |
|---|---|---|---|
| 2,799,597 | 7/1957 | Walker et al. | 427/441 X |
| 4,013,474 | 3/1977 | Teitell et al. | 427/440 X |
| 4,051,282 | 9/1977 | Davies | 427/441 X |

OTHER PUBLICATIONS

*Pentachlorophenol for Wood Preservation,* Carswell, T. S. et al., pp. 1431-1435, Nov. 1939.

*Primary Examiner*—Michael R. Lusignan
*Attorney, Agent, or Firm*—C. O. Marshall, Jr.

[57] ABSTRACT

A composition for impregnating wood with pentachlorophenol is prepared by dissolving pentachlorophenol in a petroleum fraction at least 50% of which will distill above 485° F., and mixing the resulting solution with water to produce a finely divided dispersion of the solution in water.

2 Claims, No Drawings

METHOD AND COMPOSITION FOR TREATING WOOD WITH PENTACHLOROPHENOL

BACKGROUND OF THE INVENTION

The invention relates to the treatment of wood with pentachlorophenol.

Wood used as a construction material is subject to decay and attack by fungus, termites and various beetles. For that reason, it is necessary to apply a preservative to many wood products, such as lumber, utility poles and railroad ties.

In many of the commercial plants in which a preservative is applied to wood, the substance used is creosote. Creosote has a strong and unpleasant odor, and wood which has been treated with creosote not only is unpleasant to handle but also has an unsightly appearance. The uses of wood which has been impregnated with creosote are limited also because most paints cannot be effectively applied to creosote-impregnated wood.

Pentachlorophenol is less expensive than creosote, and is at least as effective as a fungicide. However, pentachlorophenol has not been used as extensively as creosote in the treatment of wood, because it has been necessary heretofore to apply pentachlorophenol in an organic solvent, which greatly increases the cost.

The solvents commonly used in the impregnation of wood with pentachlorophenol are heavy oils such as no. 2 heating oil.

Wood also can be treated by impregnating with a solution of pentachlorophenol in a volatile solvent, and then evaporating the solvent, but the necessity of recovering the evaporated solvent further increases the cost.

The amount of oil consumed in treating wood during 1976 in the United States was about 200 million gallons.

SUMMARY OF THE INVENTION

The invention provides a novel method and composition for treating wood which makes it possible to reduce by about 85% the amount of oil used in treating wood with pentachlorophenol.

It has been the necessity of using oil as a solvent which has made pentachlorophenol more expensive to use in treating wood than creosote. By reducing by about 85% the amount of oil used as a solvent for pentachlorophenol, the present method makes it economically feasible to use pentachlorophenol in place of creosote, to produce a product which not only is superior in appearance but also is clean to handle.

The 85% reduction in the amount of oil used as a solvent for pentachlorophenol in the present method is important also because of the increasing cost and limited supply of petroleum products, and because the oils which have been used in the impregnation of wood with pentachlorophenol gradually evaporate from the treated wood, thus contributing to pollution of the atmosphere.

The present invention is based upon the discovery that it is possible to prepare a stable aqueous dispersion in which the dispersed phase is a solution of pentachlorophenol in a relatively small amount of oil, and that wood can be impregnated and penetrated successfully by the dispersion to produce commercially acceptable pentachlorophenol-impregnated products.

Pentachlorophenol

The form in which pentachlorophenol is commercially available is technical pentachlorophenol, which contains about 82 to 85% by weight of pentachlorophenol, 10 to 15% of a mixture of tetrachlorophenols and 2 to 4% of inactive impurities.

Solvent Oil

The oil employed as a solvent is a high-boiling petroleum fraction, at least 50% by weight of which distills above 485° F., the initial boiling point being about 400° F. Such an oil consists primarily of aromatic hydrocarbons, which are preferably largely naphthenic. In addition to such high-boiling petroleum fractions, the solvent oil may contain long chain alcohols, diols, ethers and ketones.

Preparation of Solution for Dispersed Phase

The solution to be used as the dispersed phase in the aqueous dispersion is prepared by mixing the pentachlorophenol with the solvent, while warming if desired to hasten the dissolution. In the resulting solution the proportion by weight of pentachlorophenol to solvent preferably is from 35:65 to 40:60. The solubility of the pentachlorophenol usually limits the maximum ratio to about 1:1, although in some cases the ratio may be as high as 55:45. There is no lower limit to this ratio, but in order not to waste solvent, it is desirable that the ratio be no lower than 25:75 or even 30:70.

EXAMPLE 1

A solvent is prepared by mixing the following:

(a) 30 kg. of No. 4 fuel oil (Initial b.p. 400° to 450° F., 90% distilling over 500° F., end point about 700° F.).

(b) 35 kg. of Pentasolv. 80 (Initial b.p. 365° F., containing 66% by weight of 12 carbon chain alcohols, 25% of 2-ethyl hexyl alcohol, 5.5% of saturated 8 carbon and 12 carbon branched chain aldehydes, and 1.5% of saturated 8 carbon and 12 carbon branched chain ethers)

(c) 35 kg. of Pentasolv. 100 (acid No. 0, ester No. 30 mg. KOH/gm., carbonyl No. 160 mg. KOH/gm., hydroxyl No. 30, Initial b.p. 172° C., 90% distilling under 324° C.).

Technical pentachlorophenol (40 kg.) is dissolved in 60 kg. of the resulting solvent.

Preparation of Dispersion

A dispersion of the pentachlorophenol solution in water is prepared by mixing the solution with water containing a water-soluble surfactant or dispersing agent. The preferred dispersing agent is an organic sulfate or sulfonate. In order to form a stable dispersion, the amount of the dispersing agent should be from about 10 to about 40 kg. for 100 kg. of solution to be dispersed. The dispersing agent may be mixed with the solution of pentachlorophenol before the water is added.

The amount of water in the dispersion is governed by the concentration of pentachlorophenol desired. For example, 870 kg. of water may be mixed with 30 kg. of dispersing agent and 100 kg. of solution containing 40 kg. of pentachlorophenol to produce a dispersion containing 4% by weight of pentachlorophenol. The concentration of pentachlorophenol in the dispersion usually is from 4 to 7%, but may range from 0.1 to 10% by weight.

EXAMPLE 2

A quantity of ¾ inch cubes of southern pine sapwood were placed in a cylinder, and superheated steam was introduced into the cylinder to drive moisture from the wood. A vacuum of 28 inches of mercury was applied to the cylinder for 15 minutes, and then air was admitted at 25 lbs. gauge pressure. The cylinder was then filled under the same pressure with a dispersion prepared by mixing a solution of 40 gm. of technical pentachlorophenol in 60 gm. of the solvent mixture of Example 1 with 30 gm. of a dispersing agent and 450 gm. of water as described above. The pressure applied to the cylinder was increased to 125 pounds gauge for 30 minutes, and then a vacuum of 28 inches of mercury was applied for 30 minutes. The blocks were then allowed to dry to a substantially constant weight by exposure to the atmosphere. During such exposure, the water from the impregnating dispersion evaporated rapidly and completely. Thus the present process results in treated wood that is lighter in weight than wood which has been impregnated with a conventional oil solution of pentachlorophenol, since the oil from such a solution evaporates very slowly. Accordingly, the present process results in a substantial saving in the cost of shipping the treated wood.

Air-dried cubes were tested by the standard soil block procedure (ASTM Standard D 1413-76). Several sets of blocks for this test were prepared as follows:

Blocks A1–A6 were prepared in accordance with this invention by repeating the above procedure six times, using a different amount of water in the dispersion in each case, to obtain a particular concentration of pentachlorophenol in each set of treated blocks.

Blocks B were ¾ inch cubes of untreated southern pine sapwood.

Blocks C1–C6 were treated by the same procedure as blocks A1–A6, except that instead of the dispersion, a conventional solution of pentachlorophenol in No. 2 diesel oil was used. For each set of blocks C1–C6, the concentration of pentachlorophenol in the solution was different, to give a particular concentration of pentachlorophenol in each set of treated blocks.

Five blocks from each set were exposed to cultures of Gloephyllum trabeum fungus in 8-ounce decay chambers and then redried to constant weight. Table 1 below shows, for each set of blocks, the pentachlorophenol content in pounds per cubic foot, and the average % weight loss incurred during the test. One block from each set was held in a sterile chamber as a control to measure the weight loss of a sterile block.

TABLE 1

| Blocks A1–A6 | | | | Blocks B | Blocks C1–C6 | | | |
|---|---|---|---|---|---|---|---|---|
| | % PCP | % Wt. Loss | Control | % Wt. Loss | | % PCP | % Wt. Loss | Control |
| A1 | .859 | 3.59 | 2.14 | B 45.87 | C1 | 1.003 | 3.47 | 5.69 |
| A2 | .700 | 3.51 | 1.42 | | C2 | .632 | 3.53 | 4.40 |
| A3 | .502 | 3.46 | 1.94 | | C3 | .479 | 3.65 | 3.79 |
| A4 | .345 | 3.42 | 2.19 | | C4 | .330 | 2.86 | 2.54 |
| A5 | .200 | 5.13 | 2.44 | | C5 | .098 | 8.17 | 3.17 |
| A6 | .043 | 21.28 | 1.83 | | C6 | .059 | 24.07 | 3.75 |

Table 2 below shows the results obtained when the above test was repeated, using a different fungus, namely *Poria monticola*.

TABLE 2

| Blocks A1–A6 | | Blocks B | Blocks C1–C6 | |
|---|---|---|---|---|
| | % Wt. Loss | % Wt. Loss | | % Wt. Loss |
| A1 | 2.87 | B 62.93 | C1 | 4.26 |
| A2 | 2.83 | | C2 | 3.41 |
| A3 | 2.67 | | C3 | 4.11 |
| A4 | 2.86 | | C4 | 3.42 |
| A5 | 3.23 | | C5 | 4.68 |
| A6 | 20.44 | | C6 | 5.06 |

The results in the above tables show that the minimum pentachlorophenol content in the wood which was necessary to prevent appreciable decay was substantially the same (0.345 lbs. per cubic foot) when the wood was treated in accordance with the present invention as when the wood was treated with a conventional solution of pentachlorophenol in oil. The present invention makes it possible to save approximately 85% of the oil used in treating wood with pentachlorophenol.

EXAMPLE 3

A potential disadvantage of impregnating wood with an aqueous medium containing a preservative is that subsequent exposure of the treated wood to moisture may cause the preservative to be leached out of the wood. In order to test for vulnerability to leaching, ¾ inch cubes of southern pine sapwood were treated in accordance with the invention by the procedure described in Example 2, using a water dilution of the dispersion sufficient to provide a particular pentachlorophenol concentration in the dispersion used to treat each group of test blocks. Corresponding groups of control blocks were treated by a procedure which was the same as described in Example 2 except that a solution of pentachlorophenol in toluene of a particular concentration was used in place of the dispersion.

The blocks thus prepared were tested for leachability in accordance with AWPA method M11-66. Four blocks of each group were placed in an 8-ounce, wide-mouth, screw-capped bottle. An inert weight was placed on top of the blocks to hold them down, and 200 ml. of deionized water was added. The uncapped bottle was left in a vacuum desicator (about ½ hour) until air bubbles no longer rose from the blocks. The weight was then removed and the bottle capped. After 6 hours and again after 24 hours, and then every 24 hours for 2 weeks, the water was removed and analyzed by lime ignition to determine chloride present as pentachlorophenol. Water removed each time was replaced with deionized water. The capped bottles were kept at a temperature of 78°–82° F.

Unleached blocks of each group as well as the leached blocks were subjected to lime ignition to determine their pentachlorophenol content.

Table 3 below shows the % by weight of pentachlorophenol in each treating dispersion or solution, and shows the average initial pentachlorophenol content of each group of blocks in pounds per cubic foot, calculated by weight gain on impregnation, and shows the initial and final content as determined by lime ignition of unleached and leached blocks.

The table also shows the amount of pentachlorophenol found in the leach water from each group of blocks, expressed as % of the initial pentachlorophenol content.

TABLE 3

| | Dispersion-treated blocks | | | | Toluene soln-treated blocks | | | |
|---|---|---|---|---|---|---|---|---|
| % PCP in | Initial PCP Content | | Content | % PCP lost | Initial PCP Content | | Content | % PCP lost |
| treating medium | By Wt. Gain | By Lime Ignition | after Leach | in leach water | By Wt. Gain | By Lime Ignition | after Leach | in leach water |
| 3.2 | 1.29 | 1.29 | 1.23 | .002 | .902 | .894 | .897 | .009 |
| 1.6 | 0.534 | 0.492 | 0.513 | .015 | .511 | .502 | .495 | .014 |
| 0.8 | 0.31 | 0.315 | 0.305 | .032 | .279 | .271 | .270 | .041 |
| 0.4 | 0.150 | 0.141 | 0.143 | .173 | .150 | .146 | .146 | .120 |

The leaching rates according to Table 3 are extremely low, so as to be insignificant in commercial use.

Examination of cross-sectional slices of wood treated by the present method, by means of a scanning electron microscope and by means of chlorine X-ray maps, indicates that the penetration of pentachlorophenol into the wood by the present method is the same as by the conventional oil solution method.

The dispersing agent in the foregoing examples consisted of a solution of 58 parts by weight of a triethanolamine salt, 5 parts of ethylene glycol monobutylether and 1.5 parts of butanol in 35.5 parts of water.

The triethanolamine salt used in the dispersing agent was of a technical grade prepared by neutralizing technical dodecyl benzene sulfonic acid with technical triethanolamine. The technical acid may contain other alkyl benzene sulfonic acids in which the alkyl side chain has from 10 to 18 carbon atoms. Technical triethanolamine is an adduct of ammonia and ethylene oxide and may contain other alkanolamines such as mono or diethanolamine.

I claim:

1. A method of impregnating wood with pentachlorophenol comprising the steps of preparing a solution of about 25 to 55 percent by weight of pentachlorophenol in an organic solvent comprising a petroleum fraction at least 50% of which will distill above 485° F., preparing a finely divided dispersion of the solution in water in which the pentachlorophenol content is from 0.1 to 10 percent by weight, and impregnating wood with the dispersion.

2. A composition for impregnating wood comprising a finely divided dispersion in water of a solution of about 25 to 55 percent by weight of pentachlorophenol in an organic solvent comprising a petroleum fraction at least 50% of which will distill above 485° F., the pentachlorophenol content of the dispersion being from 0.1 to 10 percent by weight.

* * * * *